(12) United States Patent
Weckel et al.

(10) Patent No.: US 12,169,897 B1
(45) Date of Patent: Dec. 17, 2024

(54) FIGURINE AND CONTENT GENERATION SYSTEM AND INTERFACE

(71) Applicant: Neon Wild, Inc., New York, NY (US)

(72) Inventors: Matthew Weckel, Miami, FL (US); Carlos Ramos, Miami, FL (US); Matthew Kellough, Miami, FL (US); Stephanie Reaves, Miami, FL (US)

( * ) Notice: Subject to any disclaimer, the term of this patent is extended or adjusted under 35 U.S.C. 154(b) by 81 days.

(21) Appl. No.: 17/962,458

(22) Filed: Oct. 7, 2022

Related U.S. Application Data

(60) Provisional application No. 63/262,244, filed on Oct. 7, 2021.

(51) Int. Cl.
*G06T 17/00* (2006.01)
*G06F 3/04815* (2022.01)
*G06V 40/16* (2022.01)

(52) U.S. Cl.
CPC .......... *G06T 17/00* (2013.01); *G06F 3/04815* (2013.01); *G06V 40/168* (2022.01)

(58) Field of Classification Search
CPC . G06T 2207/10024; G06T 2207/20056; G06T 2207/20076; G06T 2207/20081; G06T 5/40; G06T 5/60; G06T 7/90; G06T 7/74
See application file for complete search history.

(56) References Cited

U.S. PATENT DOCUMENTS

| 10,380,690 B2* | 8/2019 | Weng | G06F 16/215 |
| 2008/0158222 A1* | 7/2008 | Li | G06F 16/583 |
| | | | 707/E17.02 |
| 2017/0345835 A1* | 11/2017 | Liu | H01L 29/42328 |
| 2021/0158937 A1* | 5/2021 | Wu | G06V 10/764 |

* cited by examiner

*Primary Examiner* — Ming Wu
(74) *Attorney, Agent, or Firm* — Diana Mederos

(57) ABSTRACT

A computer-based system for generating customized character figures and customized stories. The system utilizes input data and transforms the data to display interactive character figures in an immersive digital form or in a physical form and generates a corresponding story to which the user can relate.

8 Claims, 10 Drawing Sheets

FIGURINE AND CONTENT GENERATION SYSTEM AND INTERFACE

CROSS REFERENCE TO RELATED APPLICATION

This application claims priority to U.S. provisional application No. 63/262,244 having a filing date of Oct. 7, 2021, and entitled System and Interface for Custom Figure and Content Generation. The entire contents therein are incorporated by reference.

FIELD OF THE DISCLOSURE

The present disclosure relates to computer-related systems and methods for generating digital and physical outputs of customized character figures based on unique user data inputs. More specifically, the system and methods pertain to customized generation of physical or digital character figures according to input data and parameters and generation of corresponding stories providing relatable, immersive, and inclusive content for users.

BACKGROUND OF THE DISCLOSURE

Video games, digital stories, and customized toys have been popular toys or entertainment since at least the 1990s and is a continuously evolving field. Customized toys such as dolls and figurines give children a sense of inclusivity, help them relate to others, and help them learn more about themselves.

Currently, people can choose dolls or figures from a limited list of options. For example, there may be doll varieties with different options such as hair color, skin color, eye color, hair texture, clothing, accessories, and size. Nevertheless, options are limited. Some popular examples are the American Girl dolls and Build-A-Bear plush animals where people can select pre-made dolls or plush animals and further customize from a defined clothing and accessory section.

On-demand customized dolls and figures are available, but do not provide true inclusive customization that represents human diversity. Specific attributes such as scars and anomalies such as heterochromia or albinism are not able to be commercially produced.

Some computer programs provide customizable options, but those are limited in the same way as physical products. As a result, there is a lack of inspiration, positivity, entertainment, inclusivity, and engagement to provide an immersive experience.

SUMMARY OF THE DISCLOSURE

What is needed is a system for customized character figures and story creation that people can relate to and be inspired in an inclusive and immersive experience. Some systems comprise a customer-facing graphical user interface or "GUI," physical fulfilment of customized character toys and accessories, and digital fulfilment of customized characters and stories. A user interacts with the GUI to select customized features, clothing, and accessories. Audiovisual hardware captures user's data. The data are processed to generate a personalized character and stories. Users select one or more stories from a digital library interface. A story API is configured with instructions to be processed to generate character and story specifics. Data are processed to generate physical representations of the personalized characters.

Some systems comprise data capture apparatuses in communication with a computer having at least one processor, memory, and executable software for transforming the input data into customized digital figures with a corresponding customized story.

Some systems comprise at least one data server and modules in communication with a content distribution network and with multimedia data inputs from a multimedia data capture device. The data are transmitted, processed, transformed, and displayed on a graphical user interface showing interactive customized character Figures and stories.

Some systems generate corresponding physical character figures based on multimedia input data.

BRIEF DESCRIPTION OF THE DRAWINGS

The accompanying drawings that are incorporated in and constitute a part of this specification illustrate several embodiments of the disclosure. Together with the description, they serve to explain the principles of the disclosure.

NUMERALS OF THE FIGURES

Figure 1:
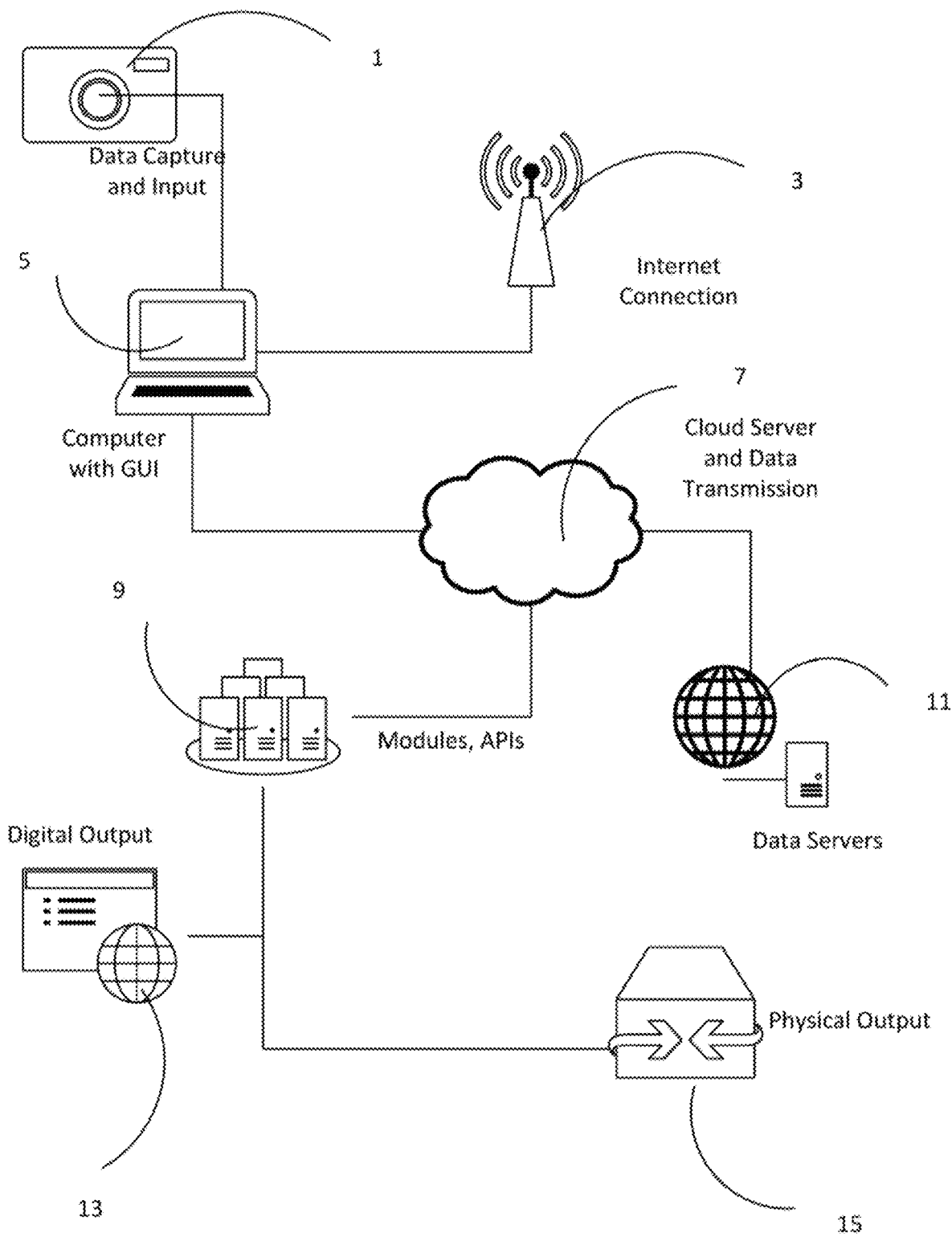
FIG. 1 illustrates a schematic of an exemplary system.

1. Camera
3. Internet connection
5. Computer with GUI
7. Cloud server
9. Software with modules and APIs
11. Data server
13. Digital output
15. Physical output
17. Physical fulfillment steps
19. Digital fulfilment steps
21. User-facing platform steps
23. Character placement service level
25. Character rigging level
27. Story API level
29. User-facing platform level
31. Character customization module
33. Client step
35. Story step
37. Character storage step
39. Character creator cache step
41. Character creator step 43. Digital photograph input
45. Generator algorithm processing
47. Digital character image
49. Loss-of-function algorithm processing
51. Discriminator algorithm processing
53. Generated training data
55. Photo capture interface
57. Feature customization interface
59. Character figure customization interface
61. Library interface
63. user
65. Physical customized character FIG.
67. Customized peripheral figure accessories

DETAILED DESCRIPTION

The exemplary computer-based system and methods generally comprise the capture of a user's features such as facial features, the selection of options based on those features, and generation of a character figure or figurine. The character figure is further customized based on various user-input data and parameters such as personality traits, likes, dislikes, functionalities, and cumulative data for additional or updated character figures and stories.

In the following sections, detailed descriptions of examples and methods of the disclosure will be given. The description of both preferred and alternative examples is exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

Referring now to FIG. 1, a schematic of an exemplary system is shown. Generally, the system comprises at least one data capture and input device, an Internet connection and content delivery network, a computer with a display showing a graphical user interface, at least one customized data server, and at least one module.

Computer systems may comprise one or more storage subsystems comprising hardware and software components used for storing data and program instructions such as system memory and computer-readable storage media. The system memory and/or computer-readable storage media may store program instructions that are loadable and executable on processors, as well as data generated during the execution of exemplary programs. Bus subsystems provide a mechanism for letting the various components and subsystems of the exemplary computer system communicate with each other as intended to generate customized character figures and corresponding stories.

The system comprises a processor configured to execute instructions for receiving user-input data and multimedia data and transforming the data into a digital character figure, a physical character figure, and a corresponding story. Computer-executable instructions include, for example, instructions and data which cause any device, computer, or special purpose processing device to perform a certain function or group of functions. Computer-executable instructions include program, platform, and application modules that are executed by computers in stand-alone or network environments.

Generally, program modules include routines, communication and interaction interfaces, programs, components, data structures, objects, and the functions inherent in the design of special-purpose processors that perform particular tasks or implement particular abstract data types. Computer-executable instructions, associated data structures, and platform modules represent examples of the platform software code for executing steps of the methods disclosed herein. The particular sequence of such executable instructions or associated data structures represents examples of corresponding acts for implementing the functions described in such steps.

Exemplary systems may utilize a plurality of databases pertaining to user-input data, module and API data, and multimedia data. One or more databases may comprise a relational database system using a structured query language (SQL), while others may comprise an alternative data storage technology.

In addition, system architectures may comprise data stores and servers that may reside in the same datacenter or may operate at a remote location from server. In some cases, one or more data stores may reside on a non-transitory storage medium within the server. Other data stores and back-end servers may be remote from server and configured to communicate with server via one or more networks such as the Internet or a content-delivery network. In some embodiments, data stores and back-end servers may reside in a storage-area network (SAN).

In some embodiments, customization databases can include a plurality of configuration profiles for character figures and stories. These can include, for example, a first configuration profile and a second configuration profile that may be modified, stored, and accessed. In some embodiments, machine learning and algorithms of configuration profiles can be customized and/or trained to create desired outputs based on the features of that configuration profile. In some embodiments, each configuration profile can further include configuration information. This configuration information can identify how to generate the features contained in the configuration profile The configuration profiles can include, for example, information specifying a plurality of features pertaining to visual features, personality traits, unique physical traits, scenery and environment features to provide an inclusive and immersive user experience.

In preferred embodiments, the system comprises modules that can control the providing and generation of data to one or several user devices or computer systems. A computing device having a wireless connection receiver and a transmitter, memory, a process, and a database stored with operably configured software is used to generate character figures. The software modules are loaded to present a graphical user interface which provides user multimedia inputs and customization controls. The software program is stored on a remote cloud server and accessed over a wireless connection. The software program platform receives and transmits commands input by a sender through the graphical user interface. Modules may control or manage user-input, database, and customization information and may receive data packet information. Some modules can function as an engine configured to transform data points from multimedia input sources and generate a customized character figure and story. Modules can include portions and functionalities located on a server and/or on a user device or computer system. Modules can be communicatively linked to engines, algorithms, and machine learning syntax and commands to generate customized character figures and stories.

User-input data and multimedia data may be derived from various input-output systems. Some input-output devices may include device controllers for one or more user interface input devices and/or user interface output devices. The devices may provide one or several outputs to a user by converting one or several electrical signals to the user in perceptible and/or interpretable form and may receive one or several inputs from the user by generating one or several electrical signals based on one or several user-caused interactions with the input-output system such as the depressing of a key or button, the moving of a mouse, the interaction with a touchscreen or trackpad.

In addition, data may be derived from input devices such as a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices may also include three-dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices.

In some embodiments, additional input devices may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, keyboards, digital musical instruments, and the like. These additional input devices further serve to add to the customization details to enhance a user experience that is inclusive and immersive.

User devices or computer systems may be configured to receive and execute client applications over one or more networks. Such client applications may be web browser-based applications and/or standalone software applications such as mobile device applications. Servers may be communicatively coupled with the client devices via one or more communication networks such as the Internet or other content-delivery network. Client devices may receive client applications from a server or from other application providers such as public or private application stores.

Servers may be configured to run one or more server software applications or services, for example, web-based or cloud-based services, to support content distribution and interaction with client devices to enable the display of immersive customized content. In turn, users operating client devices may utilize one or more client applications such as a virtual client application to interact with a server to interact with the program for generating customized character figures and stories in an immersive and inclusive environment. Customized character figure data may be exported in a digital output on a graphical user interface such as a library. Customized character figure data may also be exported externally to devices capable of receiving digital data, processing digital data, and producing a physical product or peripheral product based on the customized character figure data.

Figure 2:
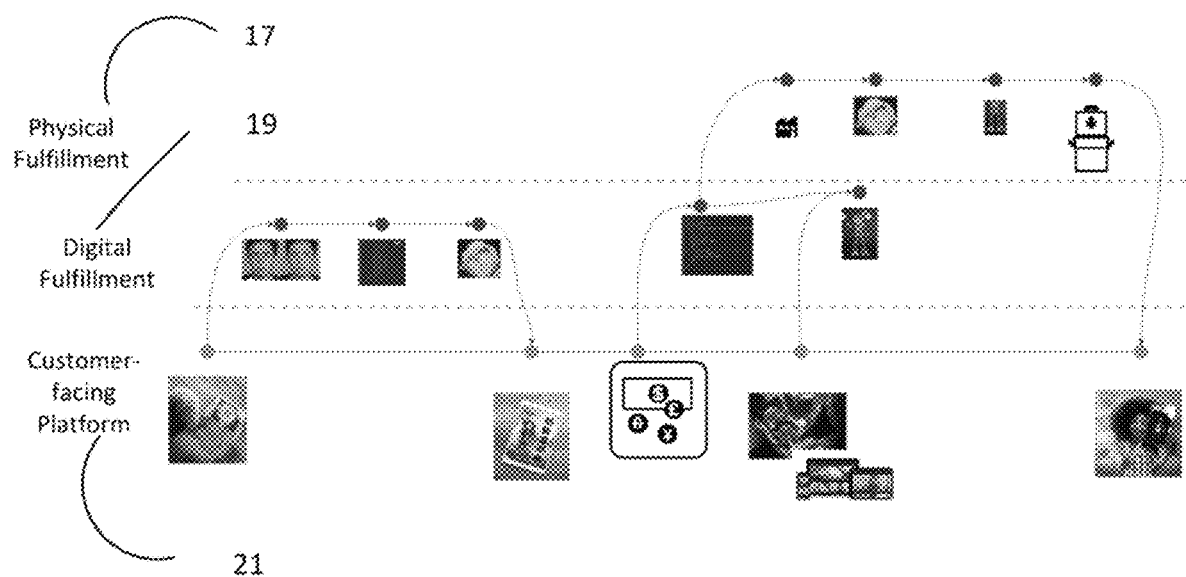
FIG. 2 illustrates a chart showing an exemplary physical process, digital process, and user interface process.

Referring now to FIG. 2, an exemplary physical process, digital process, and user interface process are shown. The system provides for digital and physical generation of customized character figures. The processes may run parallel, asynchronously, or independently.

Physical feature datapoints are captured via a multimedia input device such as a camera. Some data points may include physical feature landmarks such as size, pitch, roll, yaw from multiple viewpoints and angles to provide facial feature data used in customization of a character figure. The data may be stored in a database, accessed, and processed to generate a 3D digital rendering of a character figure head. The rendering may be done on the front end without the need for back-end servers. Nevertheless, embodiments including back-end or off-site servers are anticipated. A user may input additional data such as name, specific features, abilities, personality traits, and talents. Additional features are unlimited and are anticipated in the disclosure. Based on the user-input and database data, the system may generate a unique story in an immersive context. Users may access the digital character figure and story via a system user interface. In preferred embodiments, the data collected, processed, and stored may be transmitted to an outside manufacturer to create a corresponding physical character figure.

A user creates and customizes a character figure and may elect for further manufacturing of physical products. For example, custom character configurations may be prepared and processed for manufacturing according to at least one design-for-manufacturing algorithm. In some versions, a print-ready 3D file may be generated for exportation to a 3D printer. 3D files may be processed individually or in bulk. In other versions, a data file may be generated and exported for conventional extrusion or molded manufacturing. The manufacturing steps are followed in workflows with milestones. At each milestone, a manufacturing computer system with interface processes the progress information and transmits the information to a system fulfillment interface. A user may follow the progress of the manufacturing process such as the completion of generation and exportation of print files, post-printing alert, assembly progress, and shipping status.

Figure 3:
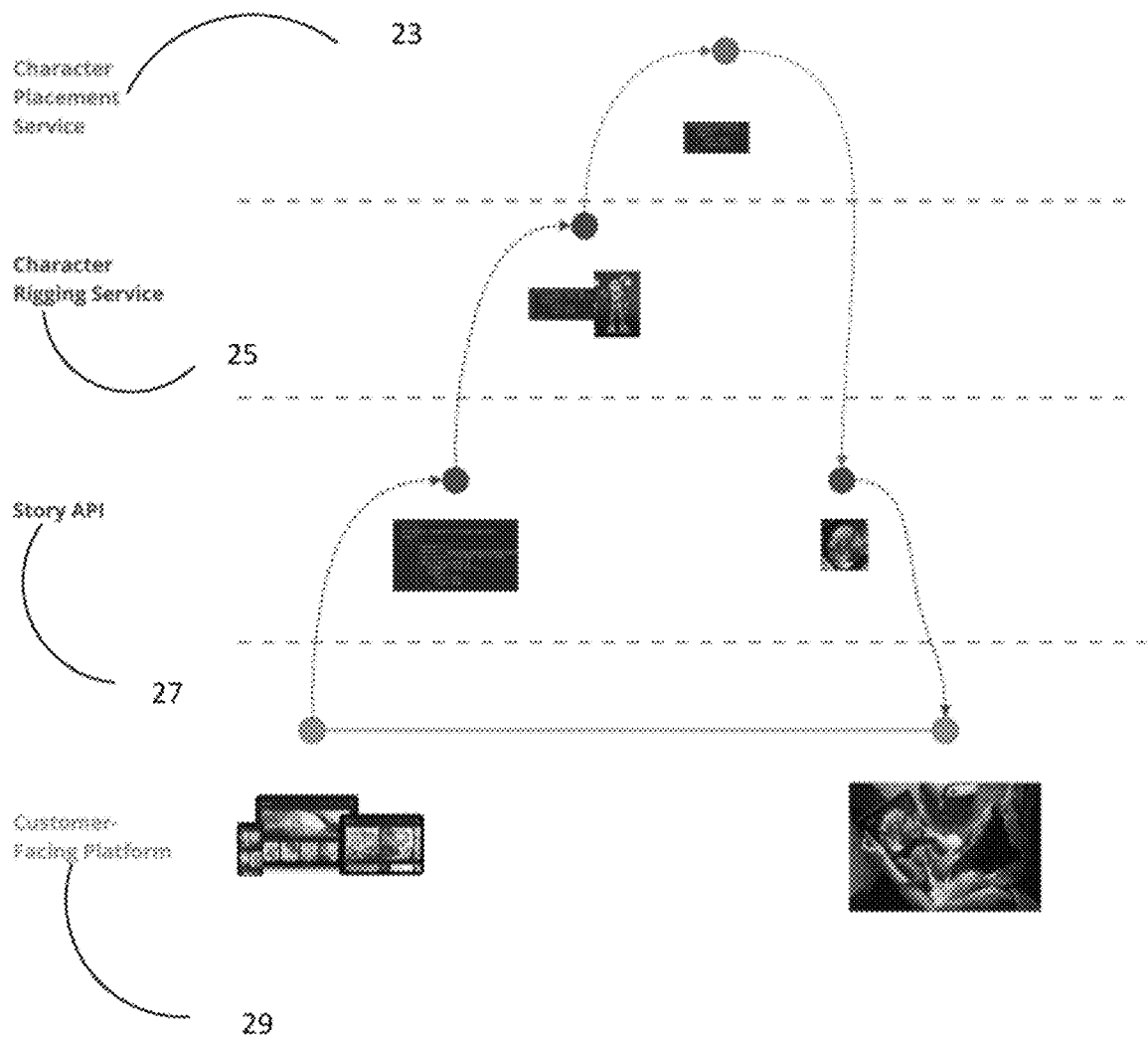
FIG. 3 illustrates an exemplary process for generating and displaying an interactive character figure and corresponding story.

Referring now to FIG. 3, an exemplary process for generating and displaying an interactive character figure and corresponding story is shown. Various modules and database information are processed to generate character context for an immersive story and character representation. Specific features derived from user input devices are determined, constructed, allocated, stored, and represented in a graphical user interface. In some embodiments, a character module and a story module may be in communication with each other to generate a 3D character and story complex providing an immersive experience. For example, a story module API may contain instructions for interface or story graphical representation layout, lighting, character positioning, and landscape that may be executed and then stored in a database. A story may be rendered from the database information and accessible via a display user interface in a virtual library. A user visualizes and interacts with the stories containing their customized character figures.

Figure 4:
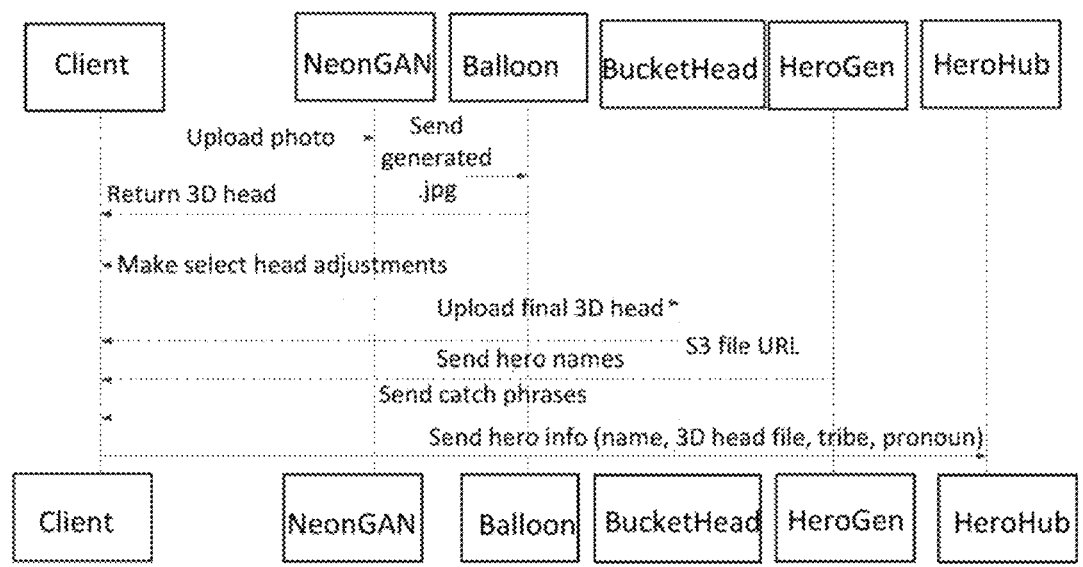
FIG. 4 illustrates an exemplary schematic of at least one character customization module.
Figure 4:

Referring now to FIG. 4, an exemplary schematic of at least one customized character module is shown. Data and process modules may be combined or separate as shown in the chart. Data may be input by a user or client and may be accessed from a database. The data are rendered into a custom character figure a user or customer can refine, edit, or adjust to transform a 2D image to a 3D figure. The diagram shows how a computing device generates a custom character figure to be displayed on a graphical user interface. After a user captures and uploads a photo comprising a head with facial features, the system generates a three-dimensional version of the digital photographic image on server in communication with the processor. The processor executes weighted discriminator and loss-of-function algorithms to transform the digital photographic image comprising a head with facial features into a digital character figure as shown in more detail in FIG. 6.

Some systems provide for automatic adjustment according to pre-set themes or templates or according to machine learning algorithms or according to the use of artificial intelligence to refine character features during character feature optimization. Names and other attributes may be added or submitted by a user. Partial or complete customized character figure files may be stored in a database or in a server for future retrieval.

Figure 5:
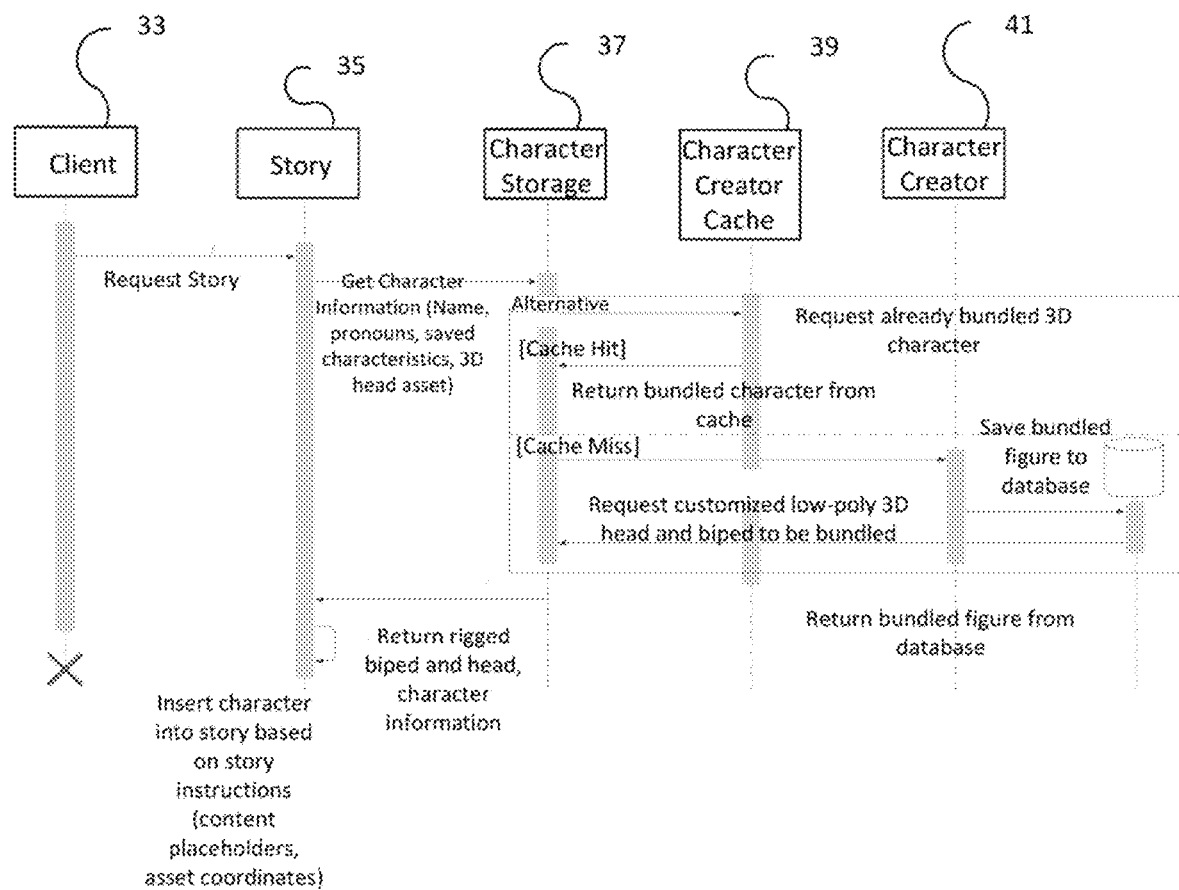
FIG. 5 illustrates an exemplary customized character figure and story schematic.

Referring now to FIG. 5, a customized character figure and story schematic is shown. A client step, a story step, a character storage step, a character creator cache step, and a character creator step are shown. Digital customized character figures may be paired with custom stories and with physical renderings. In preferred embodiments, a user interacts with a multimedia capture device such as a camera to capture facial feature datapoints. The data points are stored, accessed, and processed to generate a customized character figure. A user may further select trait, accessory, feature, or clothing choices from interacting with a user interface in communication with customization modules and/or databases.

Bundles may be generated, stored, and accessed. In some versions, a user or client creates a digital customized character figure, inputs additional characteristics such as name, and requests a story. A story is generated based on templates and story instructions. Character information from a custom configuration file is loaded into the story module. A custom configuration file may include head, body, positioning, pose, and movement characteristics, multimedia; and personality traits. In some versions, a partial or complete character figure bundle configuration file is accessed from a database and transmitted to a character storage module, a story module, or to a storefront module. The process begins with the client requesting a story. Character information is obtained from character data saved on a server or in a separate database. The character storage may comprise a hit cache for previously-submitted character requests and a miss cache for customized characters previously created.

Figure 6:
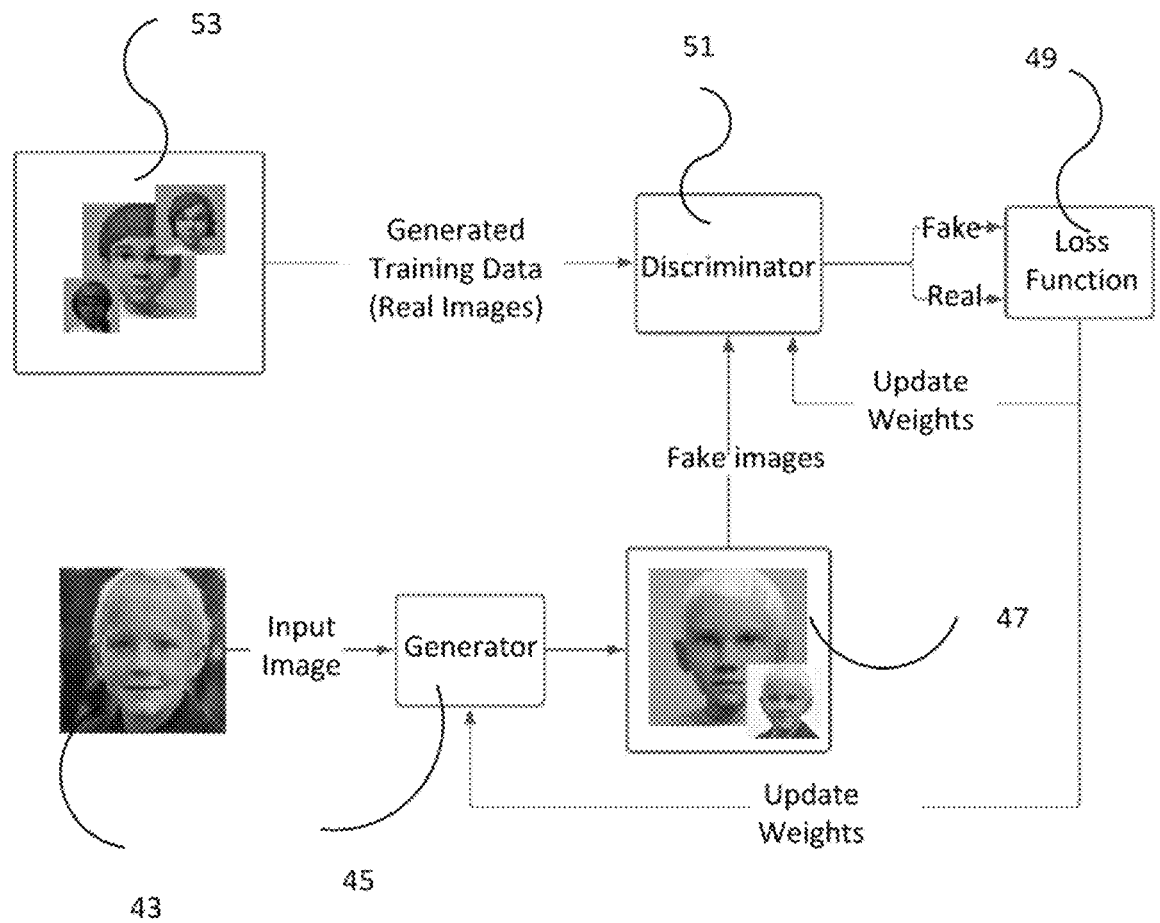
FIG. 6 illustrates an exemplary schematic for generating a customized character figure from multimedia input.

Referring now to FIG. 6, an exemplary schematic for generating a customized character figure from multimedia input is shown. Generally, a user captures multimedia or submits multimedia and additional user-input data and feature selections. Decision trees, logic, artificial intelligence, and machine learning algorithms and processes may be implemented concurrently, asynchronously, orderly, or in parallel processing to generate a customized character figure displayed in a graphical user interface. Digital images of a user' head obtained from a camera are uploaded to a system server and processed. Processors implement algorithms, loss-of-function algorithms, and discriminators with weighted values to generate a digital character image from the captured photograph data. The generated figure is displayed in a graphical user interface for further customization.

Figure 7:
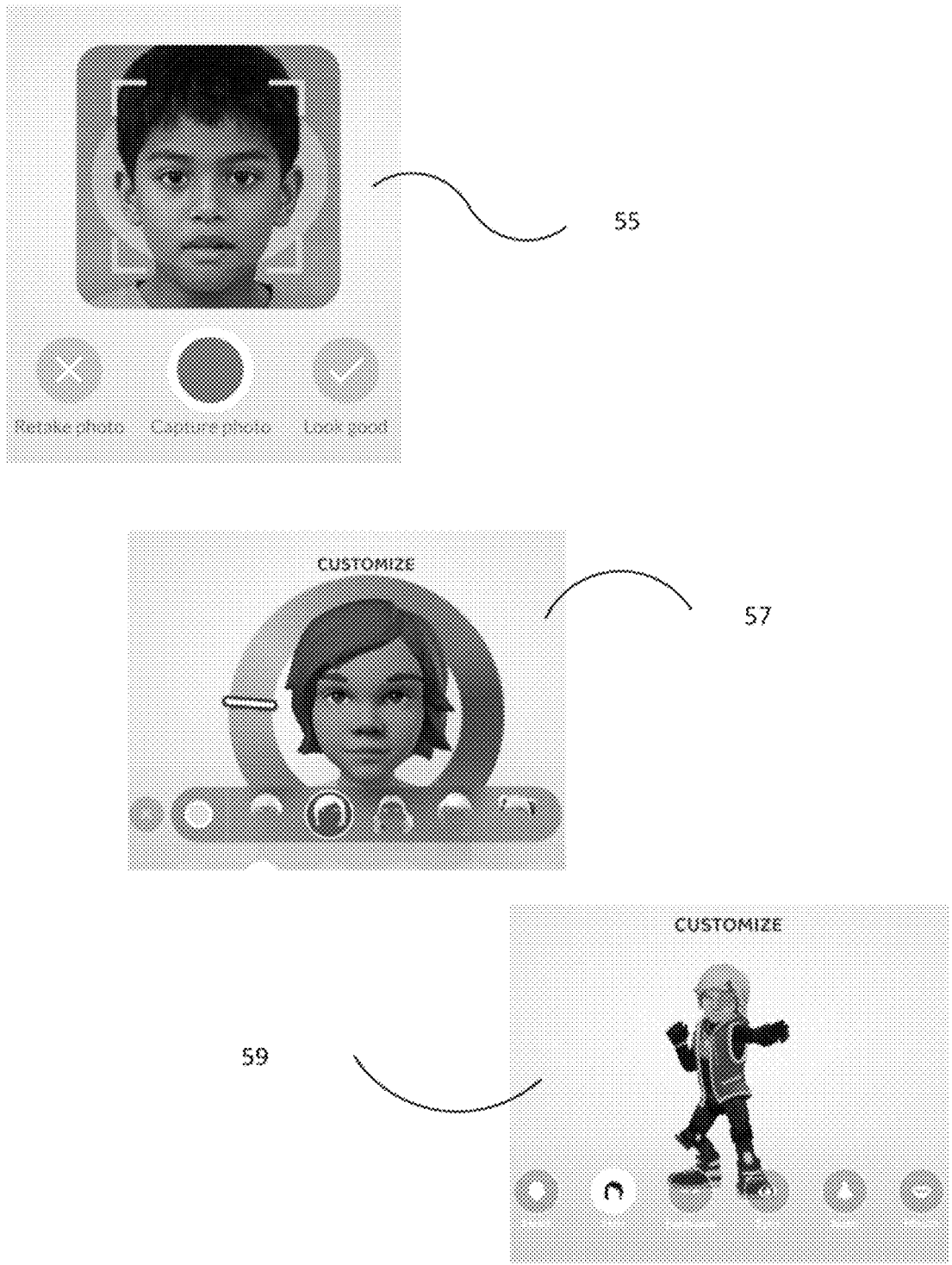
FIG. 7 illustrates exemplary graphical user interfaces for character figure customization.

Referring now to FIG. 7, exemplary graphical user interfaces for character figure customization are shown. Some graphical user interfaces display feature and trait options a user may choose to generate a customized character figure. Features may include physical features, contextual features, names, phrases, and personality features. In preferred embodiments, a user can visualize the customization progress from user input data to two-dimensional figure and to three-dimensional figure. Multimedia input such as a captured image or an uploaded photograph is processed by at least one processor configured to detect and determine datapoints from the multimedia, utilize logic schemes, machine learning, and/or artificial intelligence from at least one module, coordinate with at least one database of user-input information and system specifications, allocate features to a digital customized character figure, and generate a digital customized character figure. The user may compare the likeness of the original user input data and multimedia to the generated character figure and make feature selection adjustments on the user interface.

Figure 8:
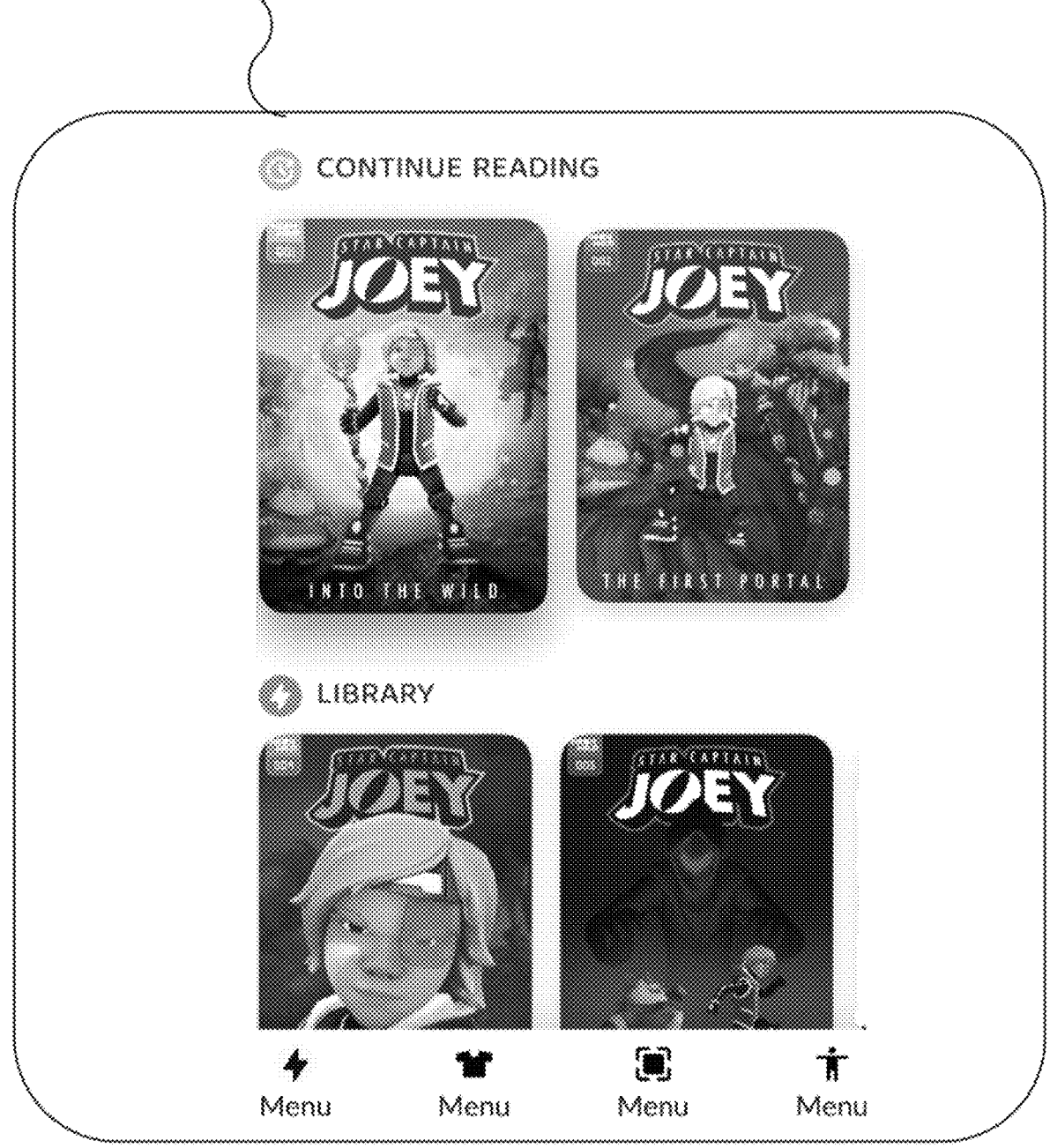
FIG. 8 illustrates exemplary personalized libraries.
Figure 9:
FIG. 9 illustrates an exemplary customized physical character figure.

Referring now to FIG. 8, an exemplary personal library graphical user interface with menu is shown. A library of one or more stories featuring one or more customized character figures may be accessible via a graphical user interface on a user's device or computing system. Personalized libraries may be presented in a digital interface or in a physical book format. The personalized libraries comprise at least one story featuring a customized character figure according to user input, name, module input, scene characteristics, and system processing. Stories may be generated independently with distinct story lines, custom characters, and traits. Stories may also be generated as a series featuring the same custom character in a variety of themes and settings. The story content may comprise multimedia such as text, static or animated images, video, and audio. Story modules may comprise a database with story templates containing information pertaining to the mechanical aspects of characters such as body positioning, posing, and movement.

Figure 10:
FIG. 10 illustrates exemplary customized peripheral accessories.
Figure 10:

Referring now to FIG. 10, an exemplary customized physical character figure is shown. The user is shown holding a physical product of a customized character FIG.

Referring now to FIG. 11, exemplary customized peripheral accessories are shown. Peripheral accessories, like a physical character figure may be generated and produced based on the context and immersive experience of the digital interface. Furthermore, the system may provide a personalized storefront interface with product options for peripheral accessories, clothing, and other goods featuring a customized character figure or customized character figure story scenes.

CONCLUSION

A number of embodiments of the present disclosure have been described. While this specification contains many specific implementation details, these details should not be construed as limitations on the scope of any disclosures or of what may be claimed.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, various modifications may be made without departing from the spirit and scope of the claimed disclosure.

What is claimed is:

1. A computing device generating a custom character figure to be displayed on a graphical user interface, the computing device comprising a wireless connection, a processor, a server, a database, and operably configured software;

wherein the computing device presents a graphical user interface generated by the processor executing commands from the operably configured software;

wherein a sole user captures with a camera a digital photographic image comprising a head with facial features and transmits the digital photographic image to a server in communication with the processor wherein the processor executes weighted discriminator and loss-of-function algorithms to transform the digital photographic image comprising a head with facial features into a digital character image with contextual features based on datapoints detected in the sole user's digital photographic image;

wherein the processor executes programmatic instructions from the operably configured software to generate a custom character figure based on the sole user's datapoints by:

requesting a story;

generating a custom configuration bundle comprising a character information file saved in a character storage module in a database comprising a hit cache containing data of previously-submitted bundled character requests and a miss cache containing data of previously-created custom character information files;

requesting a bundled character information file from the character storage module;

loading the character information file from the character storage module and transmitting the character information file to a story module wherein a story module application programming interface executes programmatic instructions to generate a story graphical representation layout based on templates and user-defined story instructions pertaining to lighting, character positioning, and landscape characteristics; and rendering on the graphical user interface the story featuring the custom character figure in an immersive context displaying the lighting, character positioning, and landscape characteristics of the graphical representation layout.

2. The computing device of claim 1 further comprising customizing the custom character figure in a customized character module wherein the processor executes programmatic instructions to transform a two-dimensional photographic image to a three-dimensional figure by determining character parameters comprising personality traits, likes, dislikes, and functionalities;

applying a decision tree to the character parameters to generate a character figure output with character context;

determining if the character context is indicative of digital character figure features, physical character features, or story features;

allocating data features to a category indicative of digital character figure features, physical character features, or story features based on data inputs; and generating digital character figures, physical character features, or story features that include a hero name and a catch phrase.

3. The computing device of claim 1 further comprising wherein the processor, executes programmatic instructions from the any configured software to save the rendered story featuring the custom character figure with character context in a custom configuration bundle in the character storage module database.

4. The computing device of claim 3 further comprising wherein the processor executes programmatic instructions to generate a three-dimensional character and story complex by accessing the custom configuration bundle from the character storage module database;

inserting the custom character figure into the story according to character context, story content, placeholders, and asset coordinates; and displaying the story in a library that is personal to the sole use.

5. The computing device of claim 3 wherein the custom configuration bundle contains a partial customized character figure file.

6. The computing device of claim 3 wherein the custom configuration bundle contains a complete character figure file.

7. The computing device of claim 1 further comprising wherein the processor executes programmatic instructions to generate from the character information file a print-ready three-dimensional file.

8. The computing device of claim 7 further comprising wherein the processor executes programmatic instructions to export the print-ready three-dimensional file to a three-dimensional printer.

* * * * *